2,998,346
PEST CONTROL
Carleton B. Scott, Pomona, Calif., assignor, by mesne assignments, to Collier Carbon and Chemical Corporation, a corporation of California
No Drawing. Filed Nov. 26, 1957, Ser. No. 698,923
7 Claims. (Cl. 167—22)

This invention relates to the control of pest organisms, and in particular concerns compositions and methods for the control of nematodes and plant disease inducing bacteria.

The invention is based on my discovery that certain thiahydrocarbons, namely, 3,6-dithiaoctane and 3,6,9-trithiaundecane, and the reaction products thereof with elemental sulfur, are toxic with respect to nematodes and plant disease inducing bacteria. These products are substantially non-phytotoxic, and may hence be advantageously employed in nematocidal and bactericidal compositions of more or less conventional formulation and suitable for use on or closely adjacent to living plants.

The two specific compounds referred to above may be defined generically by means of the formula:

$$C_2H_5\text{---}S\text{---}(C_2H_4S\text{---})_x\text{---}C_2H_5$$

wherein $x$ represents 1 or 2. The first of said compounds, i.e., 3,6-dithiaoctane, is conveniently prepared by reacting ethyl mercaptan with acetylene in the presence of a catalytic amount of metallic sodium. The reaction is usually carried out in a closed vessel under autogenic pressure at a temperature of about 300° F., and is continued until acetylene is no longer absorbed in the reaction mixture. The reaction product is then fractionally distilled to obtain the desired product as a yellow oil distilling at about 64°–70° C. under 0.6 mm. pressure. A lower boiling fraction, distilling at 80°–95° C. under 1 atmosphere is rich in ethyl vinyl sulfide, and may be recovered for use in preparing the second of the aforementioned compounds. The following example is illustrative of a typical preparation of 3,6-dithiaoctane:

Example I

Five hundred grams of ethyl mercaptan and 5 grams of metallic sodium were charged to a 4-liter rocking autoclave, and the latter was pressured up to 100 p.s.i.g. with acetylene. Dry nitrogen was then pressured into the autoclave to attain an additional 50 p.s.i.g. of internal pressure. The autoclave and contents were heated at 290°–320° F. for 5 hours, whereupon it was cooled and again pressured up to 150 p.s.i.g. with acetylene and nitrogen as before. Heating was continued at about 300° F. for 4 hours, after which the autoclave was again cooled and pressured up to 100 p.s.i.g. with acetylene alone. Heating was then resumed and carried out at about 300° F. for 6 hours. The autoclave was then cooled, and the reaction product was fractionally distilled to obtain the desired product as a higher boiling fraction and ethyl vinyl sulfide as a lower-boiling fraction.

The second of the aforementioned specific compounds, i.e., 3,6,9-trithiaundecane, is conveniently obtained by reacting ethyl vinyl sulfide with hydrogen sulfide in the presence of a catalytic amount of metallic sodium at a temperature of about 180°–300° F. and under autogenic pressure. The following example illustrates a typical preparation:

Example II

Forty-four grams of ethyl vinyl sulfide and 5 grams of metallic sodium were charged to a 3-liter rocking autoclave, and the latter was pressured up to 300 p.s.i.g. with hydrogen sulfide. The autoclave and contents were then heated at about 200° F. for 16 hours, after which the crude reaction product was removed from the autoclave and fractionally distilled. The desired compound was obtained as a yellow oil distilling at about 85°–92° C. under 0.9 mm. pressure.

The reaction products of the aforementioned compounds with elemental sulfur are obtained simply by heating a mixture of the thiahydrocarbon and elemental sulfur under atmospheric or elevated pressure. Between about 1 and about 10 atomic weights of sulfur are employed per molecular weight of the thiahydrocarbon. The reaction temperature may be varied between about 100° C. and about 250° C. and is preferably between about 125° C. and about 200° C. The time required for completion of the reaction depends upon the reaction temperature as well as upon the proportions in which the reactants are employed, but is usually between about 1 and about 24 hours. If desired, the reaction time may be shortened by adding to the reaction mixture a catalytic amount of a Friedel-Crafts type catalyst such as zinc chloride. Also if desired, the reaction may be carried out in the presence of an inert liquid reaction medium. Upon completion of the reaction the sulfurized product can be used directly and without further purification in formulating the present pest control compositions. If desired, however, the product may be gas-stripped to remove volatile byproducts and/or fractionally distilled into fractions containing varying amounts of combined sulfur. The amount of sulfur which is introduced into the thiahydrocarbon will depend upon the reaction temperature, the proportions in which the reactants are employed, and the catalyst concentration. By suitably controlling these variables such amount can be varied from 1 to about 10 atoms of added sulfur per molecule of the thiahydrocarbon. If desired, an excess of sulfur may be provided and the unreacted sulfur separated from the sulfurized product by cooling the latter to, say, 0° C. and filtering off the unreacted sulfur which is thereby precipitated. The physical and biological properties of the sulfurized products vary somewhat with the amount of sulfur contained therein, and insofar as nematocidal activity and ease of formulation into simple pest control compositions are concerned it is preferable to employ the products containing an average of from about 2 to about 6 atoms of added sulfur per molecule of the thiahydrocarbon.

To summarize the foregoing, the sulfurized products which are employed as active pest control agents in accordance with one embodiment of the invention are obtained by reacting elemental sulfur with one or a mixture of the thiahydrocarbons of the present class at a reaction temperature between about 100° C. and about 250° C. for a period of time between about 1 and about 24 hours, between about 1 and about 10 atomic weights of sulfur being employed per molecular weight of said thiahydrocarbon and said conditions of time and temperature being sufficient to effect the formation of a sulfurized product containing from 1 to an average of about 10 atoms of sulfur per molecule of said thiahydrocarbon. The following example is illustrative of a typical preparation of one of the present class of sulfurized products, but is not to be construed as limiting the invention.

Example III

A mixture of 75 parts by weight of 3,6-dithiaoctane, 64 parts by weight of elemental sulfur and 1 part by weight of zinc chloride was heated at a temperature of 150°–170° C. for 3 hours. The reaction product was then filtered to remove the zinc chloride catalyst and a small amount of unreacted sulfur, and the filtrate was then gas-stripped with dry nitrogen to remove volatile impurities. The product so obtained contained about 36% carbon, about 6.9% hydrogen and about 57.5% combined sulfur. These analytical values indicate that about 1.7 atoms of sulfur were combined with each molecule of the 3,6-dithiaoctane.

The pest control compositions provided by the invention essentially comprise one or a mixture of the active agents described above and an inert pesticidal carrier material. The latter may be either a liquid or a solid or a combination of both. When the composition is to take the form of a liquid spray, the inert carrier material is usually water, and the active ingredient is maintained dispersed or suspended therein with the aid of an organic dispersing agent. The use of such dispersed agents in formulating pest control compositions is an entirely conventional expedient, and any of the dispersing agents commonly employed for such purposes may be used. Alternatively, the active ingredient may be mixed with an inert solid carrier material such as talc, diatomaceous earth, aluminum silicate, etc. to form dry compositions which can be employed directly as dusts or which can be dispersed in an aqueous or oleaginous medium to form a liquid spray. In general, any of the conventional formulation and application techniques may be followed in employing the present active agents in pest control compositions, and any of the wetting agents, spreaders, sticking agents, diluents, carrier materials, etc. which are conventionally employed in formulating pest control compositions may be used in combination with the present active agents.

The active agents of the present class are effective in relatively small quantities, and in the intersests of economy they are usually formulated in concentrations of the order of 50–4000 parts per million. The compositions themselves are of course employed in amounts to secure the desired degree of control, e.g., in controlling nematodes the composition usually is applied to the soil in amounts sufficient to provide 10–1000 parts of the active ingredient per million parts of soil. Liquid concentrate compositions which are adapted to be diluted to such concentrations before use usually contain between about 1 and about 15 percent by weight of the active ingredient and sufficient of an emulsified or dispersing agent to maintain the active ingredient uniformly suspended in the liquid carrier material which constitutes all or the major proportion of the remainder of the composition. Solid concentrate compositions usually contain between about 5 and about 50% by weight of the active ingredient, small amounts of dispersing agents, spreading agents and other conventional adjuvants, with the remainder being a conventional solid carrier material.

The following examples will illustrate the formulation of a number of pest control compositions within the scope of the invention.

*Example IV*

| | Lbs. |
|---|---|
| 3,6-dithiaoctane | 2.0 |
| Attapulgus clay | 2.5 |
| Aluminum silicate | 4.0 |
| Powdered blood albumen | 0.2 |

The ingredients are thoroughly admixed in a ball mill to obtain a dusting composition.

*Example V*

| | Lbs. |
|---|---|
| Reaction product of 3,6-dithiaoctane with 5 atomic weights of sulfur | 2.5 |
| Water | 50.0 |
| Powdered blood albumen | 0.25 |

The sulfurized product and blood albumen are added to the water and the mixture is passed through a colloid mill or high-speed blender to obtain a concentrate composition which can be diluted 1000:1 with water to form a composition suitable for direct application to nematode-infested soil.

*Example VI*

| | Lbs. |
|---|---|
| 3,6,9-trithiaundecane | 2.5 |
| Benzene | 0.5 |
| Non-ionic dispersing agent (Triton X–100) | 1.0 |
| Water | 2500.0 |

The active ingredient is dissolved in the benzene and the dispersing agent is admixed with the water. The two solutions are then combined and passed through a homogenizer to obtain a spray composition.

*Example VII*

| | Lbs. |
|---|---|
| Reaction product 3,6,9-trithiaundecane with 1 atomic weight of elemental sulfur | 2.0 |
| Walnut shell flour | 40.0 |
| Petroleum sulfonates | 0.3 |

The ingredients are admixed in a ball mill to obtain a dry concentrate composition which can subsequently be dispersed in water to form a spray suitable for direct application to bacteria-infested soil.

*Example VIII*

| | Lbs. |
|---|---|
| Reaction product of 3,6-dithiaoctane with 10 atomic weights of sulfur | 0.5 |
| Benzene | 0.1 |
| Non-ionic dispersing agent (Triton X–100) | 0.2 |
| Attapulgus clay | 1.5 |
| Water | 500.0 |

*Example IX*

| | Lbs. |
|---|---|
| Active ingredient | 10.0 |
| Attapulgus clay | 30.0 |
| "Neoterge" wetting agent | 0.12 |
| "Dupanol ME" wetting agent | 0.05 |
| Lignin sulfate suspending agent | 0.12 |

The ingredients are thoroughly admixed by grinding together in a mortar to form a wettable powder which is employed in demonstrating the pesticidal activity of the present class of nematocidal and bactericidal products. The composition so prepared is then dispersed in water to the desired test concentration. In carrying out in vitro tests on bacteria a concentrated aqueous dispersion of the wettable powder formulation is added to a standard culture medium consisting of potato dextrose agar, yeast extract and calcium carbonate to obtain a culture medium containing 50 parts per million of the active ingredient. Four samples of the medium so prepared are then innoculated with *Erwinia carotovora*, *Pseudomonas syringae*, *Agrobacterium tumefaciens*, and *Xanthomonas juglandis*, respectively. After incubation for two days the innoculated media are examined for bacterial growth. The following data were obtained by subjecting several of the present active ingredients to such procedure:

| Test compounds: | Percent kill of 4 bacteria tested |
|---|---|
| 3,6-dithiaoctane | 100 |
| Reaction product of 3,6-dithiaoctane and 4 atomic weights of sulfur | 100 |

In testing for nemotocidal activity the following procedure is employed: A concentrated dispersion of the test material in wettable powder form is prepared as described above and the concentrate is diluted with water to form an emulsion spray. Soil which is infested with root knot nematodes is then drenched with this emulsion to provide a concentration of 200 parts per million of the test material, based on the weight of the soil, and the treated soil is allowed to stand for one week. Tomato seeds are then planted in the treated soil and the seeds are allowed to germinate under greenhouse conditions. After a two-month growing period the plants are measured for height and are examined for root galls. The degree of control is obtained by comparing the number of galls on the plants grown in the treated soil with the number of galls on plants grown in untreated soil. The following results were obtained in subjecting several of the active ingredients of the present class to this procedure.

Active ingredient: Percent nematode control
- 3,6-dithiaoctane _____ 95–100
- 3,6,9-trithiaundecane _____ 95–100
- Reaction product of 3,6-dithiaoctane and 4 atomic weights of sulfur _____ 95–100

Other modes of applying the principles of my invention may be employed instead of those explained, change being made as regards the methods or materials employed, provided the product or steps stated by any of the following claims, or the equivalent of such stated products or steps, be obtained or employed.

I, therefore, particularly point out and distinctly claim as my invention:

1. A method of controlling the growth of nematodes and bacteria in soil which comprises applying thereto a nematocidal and bactericidal amount of a composition comprising an inert pesticidal carrier material and, as the essential active ingredient, a material selected from the class consisting of 3,6-dithiaoctane, 3,6,9-trithiaundecane, and the reaction products obtained by heating one of said thiahydrocarbons with elemental sulfur at a temperature between about 100° C. and about 250° C. for a period of time between about 1 and about 24 hours, between about 1 and about 10 atomic weights of sulfur being employed per molecular weight of said thiahydrocarbon and said conditions of time and temperature being sufficient to effect the formation of a sulfurized thiahydrocarbon containing from 1 to an average of about 10 atoms of sulfur per molecule of said thiahydrocarbon reactant.

2. A method as defined by claim 1 wherein the said carrier material comprises a particulate inorganic solid.

3. A method as defined by claim 1 wherein said carrier material comprises water and sufficient of a dispersing agent to maintain said active ingredient uniformly dispersed in said water.

4. A method as defined by claim 1 wherein the said active ingredient is 3,6-dithiaoctane.

5. A method as defined by claim 1 wherein the said active ingredient is 3,6,9-trithiaundecane.

6. A method as defined by claim 1 wherein the said active ingredient is said reaction product of elemental sulfur and a thiahydrocarbon selected from the class consisting of 3,6-dithiaoctane and 3,6,9-trithiaundecane.

7. A method as defined by claim 6 wherein the said reaction product is formed by heating a mixture comprising elemental sulfur and said thiahydrocarbon at a reaction temperature between about 125° C. and about 200° C. for a period of time between about 1 and about 24 hours in the presence of a catalytic amount of a Friedel-Crafts catalyst, between about 2 and about 6 atomic weights of sulfur being employed per molecular weight of the said thiahydrocarbon and said conditions of time and temperature being sufficient to effect the formation of a sulfurized thiahydrocarbon containing an average of from about 2 to about 6 atoms of sulfur per molecule of said thiahydrocarbon.

References Cited in the file of this patent

UNITED STATES PATENTS

| | | |
|---|---|---|
| 2,519,586 | McCaulay et al. | Aug. 22, 1950 |
| 2,664,414 | Morris et al. | Dec. 29, 1953 |
| 2,864,739 | Scott et al. | Dec. 16, 1958 |
| 2,877,153 | Webb et al. | Mar. 10, 1959 |
| 2,882,197 | Webb et al. | Apr. 14, 1959 |